Feb. 2, 1960　　　　　　F. S. HOWARD　　　　　　2,923,789
SPEED GOVERNOR FOR MOTORS
Filed Sept. 26, 1957　　　　　　　　　　2 Sheets-Sheet 1
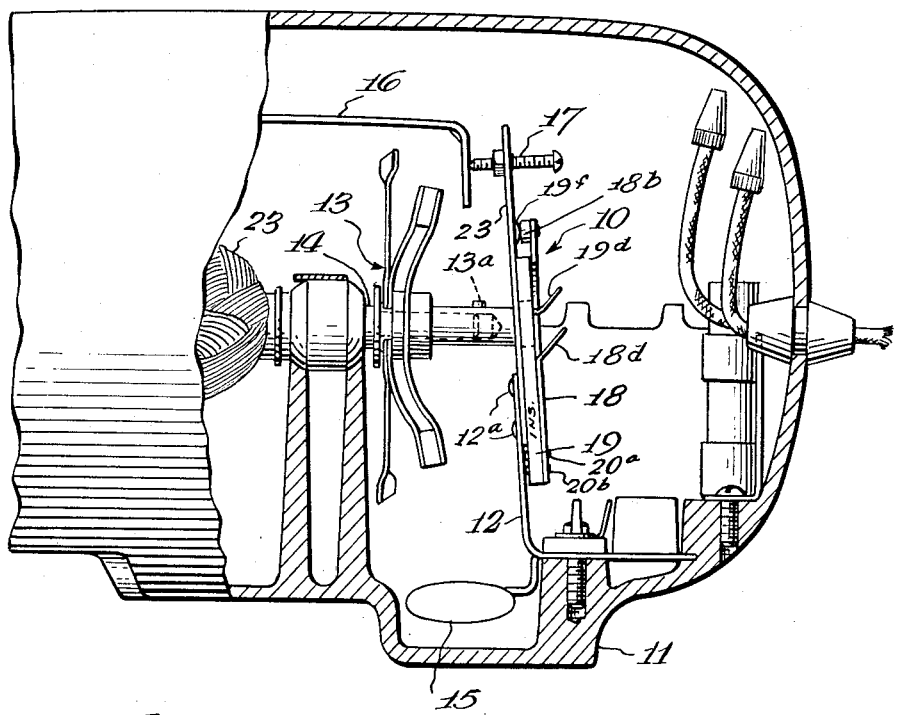
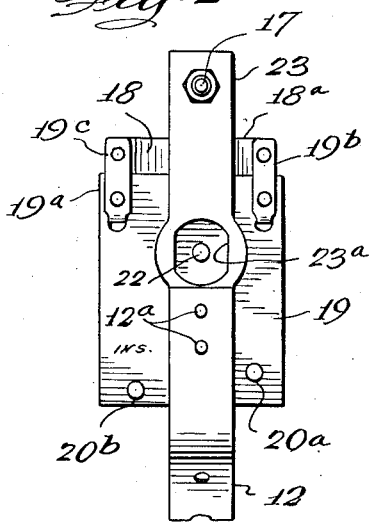
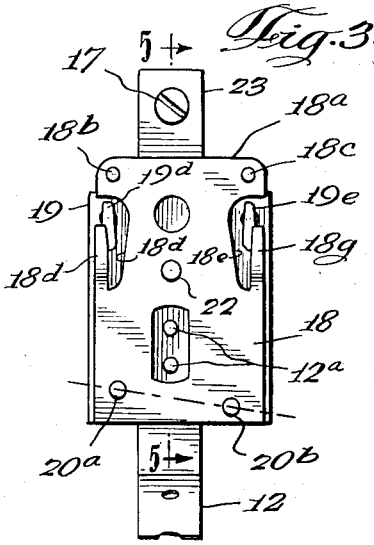
Inventor
Frank S. Howard

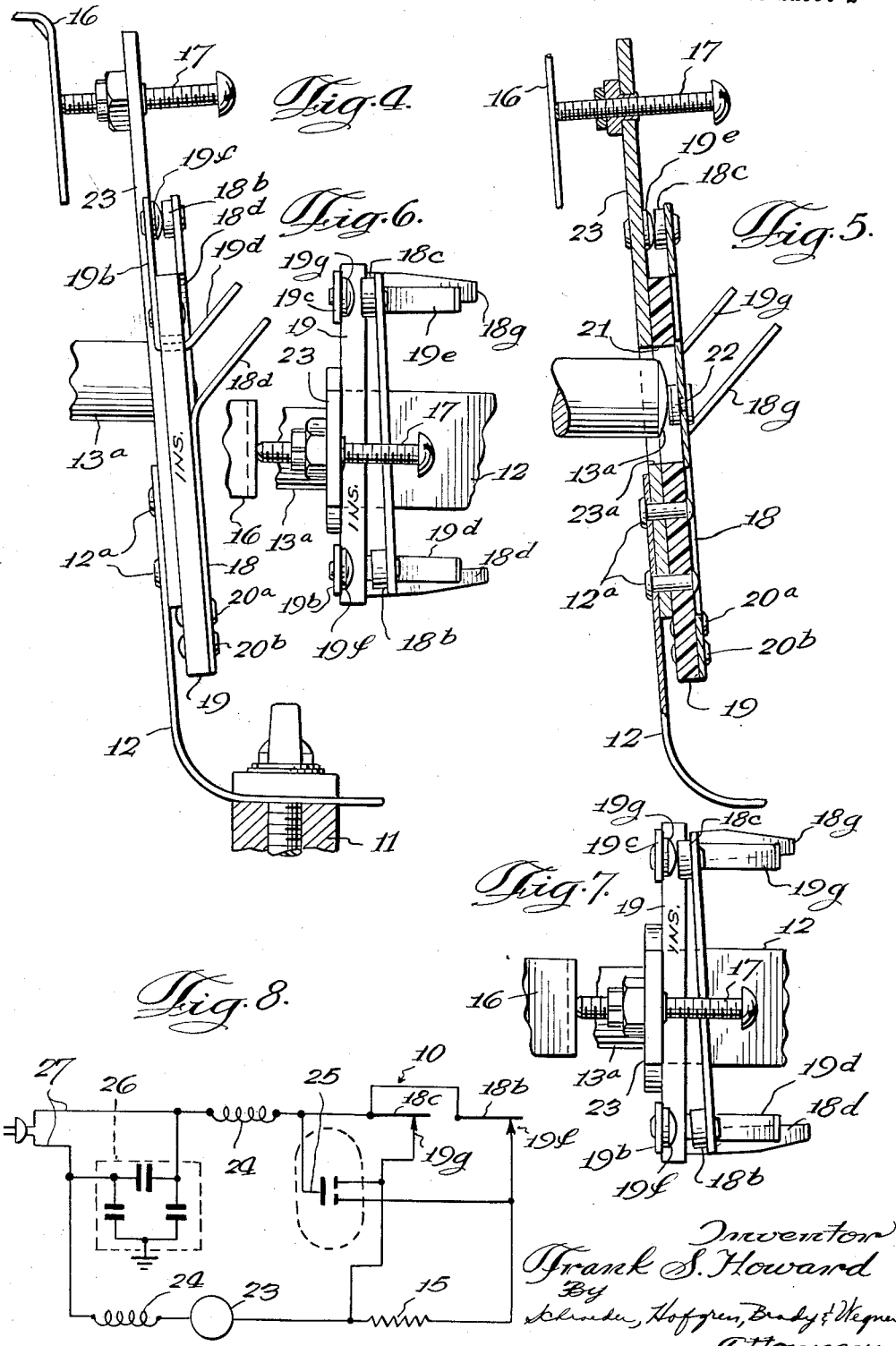

United States Patent Office 2,923,789
Patented Feb. 2, 1960

2,923,789

SPEED GOVERNOR FOR MOTORS

Frank S. Howard, Round Lake, Ill., assignor to Whirlpool Corporation, a corporation of Delaware Application September 26, 1957, Serial No. 686,486

10 Claims. (Cl. 200—80)

This invention relates to a speed governor for a motor and in particular to a new and improved switch mechanism for use therein.

A known method of controlling the speed of an electric motor is to control the current flowing therethrough by means of a switch mechanism which operates as a function of the speed of the motor. Associated with the switch mechanism is a current limiting device, such as a resistor, which is alternatively electrically inserted and withdrawn from the power supply circuit to the motor depending on the speed at which the motor is operating. Thus, when the motor is operating at a speed lower than that desired, the switch mechanism is arranged to short out the current limiting means and allow unimpeded current flow to the motor. The resultant increase in the speed of the motor effects an operation of the switch mechanism to reinsert the current limiting means into the motor current supply. This decreases the speed of the motor until the speed is sufficiently low to effect the reverse operation of the switch mechanism, to short out again the current limiting means. A continuous cycle of the above described operation results in operation of the motor at a speed which may vary only slightly about a predetermined desired speed.

The instant invention relates to an improved switch mechanism, for use in such a motor speed control device as described above, which obviates certain disadvantages of the known switch mechanisms such as complexity and costliness of structure and difficulty of maintaining adjustment thereof.

The principal feature of this invention is to provide a new and improved switch mechanism.

Another feature is that the switch mechanism is extremely simple and economical of construction.

A further feature is that the switch mechanism is arranged for automatically adjusted relationship of stepped functioning of a plurality of electrical contact means associated therewith.

Still another feature of the invention is the provision of such a switch mechanism having new and improved terminal means.

Other features and advantages of this invention will be apparent from the following description taken in connection with the accompanying drawings wherein:

Fig. 1 is a fragmentary elevation partially in section of a motor provided with a speed regulating means having a switch mechanism embodying the invention;

Fig. 2 is a front elevation of the switch mechanism;

Fig. 3 is a rear elevation thereof;

Fig. 4 is an enlarged side elevation thereof, together with portions of associated control mechanism;

Fig. 5 is a section taken approximately along the line 5—5 of Fig. 3;

Fig. 6 is a top plan view of the switch means and associated control mechanism, both contacts of the switch means being shown in the open position.

Fig. 7 is a top plan view of the switch means and associated control mechanism, one contact of the switch means being in the open position and one contact thereof in the closed position; and Fig. 8 is a schematic electrical diagram of a motor speed control circuit utilizing the switch mechanism.

In the exemplary embodiment of the invention as disclosed in the drawings, a motor is shown to be controlled by means of speed regulating apparatus including a switch mechanism operated by a governor device carried on the shaft of the motor. Electrically associated with the switch mechanism and the motor windings is a current limiting device which is electrically inserted into the power supply circuit to the motor to reduce the speed of the motor whenever the speed thereof exceeds a predetermined rate. To adjust the switch mechanism to be operative at the predetermined rate a manually adjustable control mechanism is provided to affect suitably the structure of the switch mechanism.

More specifically, the speed governing means comprises a switch mechanism generally designated 10 carried on the frame 11 of the motor by means of a spring support 12. A mechanical governor means generally designated 13 is mounted on one end of the shaft 14 of the motor and is arranged to act on switch mechanism 10 to effect desired operation thereof. Governor means 13 may be of any suitable construction well known in the art wherein an output is produced by means such as an operating member or slider 13a, which moves in opposite directions along a linear path as a direct function of the speed of the device controlled by the governor. For purposes of the instant invention it merely need be understood that governor means 13 effects a movement of operating member or slider 13a to the right, as seen in Fig. 1, when the motor speed increases, and permits a movement of operating member 13a to the left, as seen in Fig. 1, when the motor speed decreases.

The current limiting means is herein disclosed as comprising a resistor 15 mounted on motor frame 11 adjacent spring support 12. The means for manually adjusting the arrangement of switch mechanism 10 is shown to comprise a control rod 16 operatively associated with the switch mechanism by means of an adjustable connecting screw 17.

The specific structure of switch mechanism 10 is best seen by reference to Figs. 2 through 7 wherein the mechanism is seen to comprise a first support plate 18 and a facially juxtaposed second plate 19. Plates 18 and 19 are marginally substantially coextensive except that the upper end 18a of support plate 18 is arranged to extend somewhat above the upper end 19a of the second plate 19. Support plate 18 is preferably formed of resiliently flexible, conducting material, such as phosphor bronze, and a pair of contacts 18b and 18c are carried on upper end 18a in electrical conductive relationship therewith. Second plate 19 is preferably formed of a rigid, insulating material, such as a phenolic plastic, and a pair of contact elements 19b and 19c, corresponding to contacts 18b and 18c, is secured to the upper end 19a thereof. Immediately below contacts 18b and 18c, support plate 18 is provided with cut-out portions 18d and 18e respectively and the body of the plate is struck outwardly from adjacent the cut-out portions to form a pair of fingers comprising electrical terminals 18f and 18g respectively.

Contact elements 19b and 19c include blade portions 19d and 19e respectively and contact tips 19f and 19g respectively. The blade portions 19d and 19e are extended through plate 19 and through cut-out portions 18d and 18e of the support plate to be arranged in spaced, general alignment with terminals 18f and 18g of the support plate, and are arranged similarly to comprise electrical connection terminals. The extension of each of terminals 18f, 18g, 19d and 19e to the rear of switch mechanism 10 permits increased facility in making necessary electrical connections thereto as the terminals are thus positioned for maximized accessibility.

Plates 18 and 19 are secured together at their lower ends by suitable means such as rivets 20a and 20b. The rivets are spaced laterally of the transverse center of plates 18 and 19 and rivet 20a is disposed somewhat upwardly (toward plate end 18a) relative to rivet 20b so that the spacing between rivet 20a and contact 18b is somewhat less than the spacing between rivet 20b and contact 18c, as best seen in Fig. 3. Thus, a flexure of support plate 18 about a line drawn through rivets 20a and 20b effects a greater movement of contact 18c than of contact 18b.

Extending through second plate 19 adjacent the midportion thereof is an opening 21. On support plate 18 and in registry with opening 21 of plate 19, is an abutment button 22 which is arranged to be engaged by the end of operating member 13a which extends through opening 21. Button 22 is positioned closer to the side of support plate 18 on which contact 18b is mounted, than to the opposite side of the support plate on which contact 18c is mounted. Resultingly, button 22 lies to one side of a longitudinal line of flexure of support plate 18 extending generally perpendicularly to the line between rivets 20a and 20b. Thus, when operating member 13a is moved longitudinally to the right as seen in Fig. 1 to act against button 22, two distinct flexing actions of support plate 18 are obtained, namely: (1) a twisting of the support plate first occurs about a line extending generally longitudinally thereof whereby contact 18b is urged away from contact tip 19f while contact 18c remains in engagement with contact tip 19g; and (2) a bending of the support plate about a line through rivets 20a and 20b occurs subsequent to the twisting action described above, whereby contact 18c is removed from engagement with contact tip 19g.

As discussed above switch mechanism 10 is carried on the motor frame 11 by means of a spring support 12. Spring support 12 comprises a flat spring element secured at its outer end to second plate 19 by suitable means, as rivets 12a, and is biased to swing switch mechanism 10 in a counterclockwise direction, as seen in Fig. 1, whereby button 22 is brought into contact with the end of operating member 13a. When the motor is not operating, control rod 16 is at the left limit of its longitudinal movement, as seen in Fig. 1. Adjusting screw 17 is carried on a bar 23 which is secured to second plate 19 and spring support by means of rivets 12a discussed above. Bar 23 is provided with an opening 23a in registry with opening 21 of plate 19 to accommodate the free passage therethrough of operating member 13a. Screw 17 is adjusted so that in the motor deenergized position of the switch mechanism, second plate 19 is spaced from support plate 18 (which is held by the abutment of button 22 with operating member 13a against following second plate 19) under the biasing action of spring support 12. Thus, as seen in Fig. 6, contact 18b is spaced from contact tip 19f and contact 18c is spaced from contact tip 19g, thereby opening the power supply circuit to the motor. To effect operation of the motor at a desired predetermined speed, control rod 16 is moved longitudinally to the right, as seen in Fig. 1, to a predetermined position. For substantially all normal operating speeds the movement of rod 16 is sufficient only to move second plate 19 to a position wherein operating member 13a may flex support plate 18 away from second plate 19 to effect an opening of at least one of the pairs of contacts 18b—19f and 18c—19g. However, at its extreme travel, rod 16 may dispose second plate 19 sufficiently to the right, as viewed in Fig. 1, to preclude operating member 13a from moving support plate 18 sufficiently to open either pair of contacts, even at the extreme right hand disposition of the operating member (i.e. the disposition of operating member 13a corresponding to the maximum speed of the motor). Thus, the motor would be connected across the line and no speed regulation as described above would be effected by switch mechanism.

In the functioning of switch means 10 to regulate the motor speed, a skewed arrangement of support plate 18, as seen in Fig. 7, is caused by the twisting action of operating member 13a resulting from the off-center disposition of button 22 relative to the generally longitudinal center line of the support plate, as discussed above. Thus, contact pair 18b—19f is opened first as the motor speed increases. When the motor has reached the speed at which governor means 13 causes operating member 13a to extend sufficiently to the right, as seen in Fig. 1, to flex support plate 18 about the line through rivets 20a and 20b, contact pair 18c—19g is opened, as seen in Fig. 6.

The motor control circuitry is seen in Fig. 8. Switch mechanism 10 is shown to be electrically associated with resistor 15 to provide a two-step energization of the motor armature 23 and field coils 24. More specifically, contact pair 18c—19g is arranged in electrical series relationship with resistor 15, armature 23 and field coils 24. Thus, when contact pair 18c—19g is closed, the motor operates at a reduced speed as determined by the specific characteristics of the motor, the resistor and the load being driven by the motor. Contact pair 18b—19f is arranged, when closed, to short circuit resistor 15 and permit full current to flow through the motor armature 23 and field coils 24. Thus, when contact pair 18b—19f is closed, the motor operates at the maximum speed as determined by its characteristics and the characteristics of the load. If desired, an arc quenching condensor 25 may be connected across each of contact pairs 18b—19f and 18c—19g to extend the life of the contacts. Also if desired, a grounded condensor assembly 26 may be electrically associated with the input leads 27 to reduce electrical interference effects on equipment, such as radios, connected to the same power line.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Means for regulating the operation of a motor, comprising: a first pair of electrically insulated, spaced contacts; a second pair of corresponding, electrically connected contacts; a support plate carrying said second pair of contacts and biased to urge said second pair of contacts into closed relationship with said first pair of contacts; an operating member movable as a function of the operation of the motor at and above a predetermined speed to move a portion of the support plate carrying one of said second pair of contacts about a first axis in the flat plane thereof thereby to overcome said biasing of the support plate and dispose said one of said second pair of contacts in opened relationship with said first pair of contacts, and movable as a function of the operation of the motor at a speed higher than said predetermined speed to move a portion of the support plate carrying the other of said second pair of contacts about a second axis in the central flat plane thereof and substantially perpendicular to said first axis thereby to overcome further said biasing of the support plate and dispose said other of said second pair of contacts in opened relationship with said first pair of contacts; and means operably associated with the contacts and motor to control the energization of the motor as a function of the disposition of said contact means.

2. The means for regulating the speed of a motor of claim 1 wherein the support plate is formed of an electrically conductive material and said second contact means are electrically connected thereto whereby said support plate provides the electrical connection of said second contact means.

3. Means for regulating the speed of a motor, comprising: a first pair of contact means; a second pair of contact means; a resiliently flexible support plate having a portion carrying said second contact means and supported at a portion spaced from the portion carrying said second contact means, said support plate being biased to urge said second contact means into closed relationship with said first contact means; an operating member movable as an incident of operation of the motor at and above a predetermined speed to move a portion of the support plate carrying one of said pair of second contact means about a first axis in the flat plane thereof extending from intermediate said pairs of contact means toward the portion whereat the plate is supported, said operating member engaging the plate between said axis and said one of said pairs of contact means thereby to overcome said bias of the support plate and dispose said one of said pair of second contact means in opened relationship with said first pair of contact means, and movable as an incident of operation of the motor at a speed higher than said predetermined speed to move a portion of the support plate carrying the other of said pair of second contact means about a second axis in the central flat plane thereof and substantially perpendicular to said first axis thereby to overcome further said bias of the support plate and dispose said other of said pair of second contact means in opened relationship with said first pair of contact means; and means operably associated with the contact means and motor to control the energization of the motor as a function of the disposition of said contact means.

4. The means for regulating the speed of a motor, of claim 3, wherein the support plate is supported at a pair of spaced points.

5. Means for regulating the speed of a motor, comprising: a plate member of insulating material; a first pair of contact means on said plate member; a second pair of contact means; a resiliently flexible plate having a portion carrying said contact second means and a portion spaced from the portion carrying said second contact means secured to said plate member to align said pairs of contact means, said support plate being biased to urge said second contact means into closed relationship with said first contact means; an operating member movable as an incident of operation of the motor at and above a predetermined speed to move a portion of the support plate carrying one of said pair of second contact means about a first axis in the flat plane thereof extending from intermediate said pairs of contact means toward the portion whereat the plate is supported, said operating member engaging the plate between said axis and said one of said pairs of contact means thereby to overcome said bias of the support plate and dispose said one of said pair of second contact means in opened relationship with said first pair of contact means, and movable as an incident of operation of the motor at a speed higher than said predetermined speed to move a portion of the support plate carrying the other of said pair of second contact means about a second axis in the central flat plane thereof and substantially perpendicular to said first axis thereby to overcome further said bias of the support plate and dispose said other of said pair of second contact means in opened relationship with said first pair of contact means; and means operably associated with the contact means and motor to control the energization of the motor as a function of the disposition of said contact means.

6. The means for regulating the speed of a motor of claim 6 wherein the plate member is carried on a spring support biasing the plate member together with the support plate and contact means thereon toward the operating member, the movement of said support plate being limited by engagement thereof with the operating member thereby tending to open said contact means, and a control mechanism is provided for overcoming the biasing of the spring support and disposing the plate member alternatively with said one and both of said pair of second contact means in closed relationship with the corresponding first contact means.

7. The means for regulating the speed of a motor of claim 6 wherein adjustable means are associated with said plate member and said control mechanism for correlating the position of the control mechanism with the predetermined speed of the motor which causes the operating member to effect an opening of said contact means.

8. The means for regulating the speed of a motor of claim 6 wherein an adjustable screw member is interposed between said plate member and said control mechanism for correlating the position of the control mechanism with the predetermined speed of the motor which causes the operating member to effect an opening of said contact means.

9. Switch means comprising: a first pair of contacts; a second pair of contacts; a flexible resilient support plate having a mounting portion and a portion spaced therefrom carrying the second pair of contacts, the support plate being biased to urge the second pair of contacts into engagement with the first pair of contacts; a movable operating member in engagement with said plate intermediate said mounting portion and the contact carrying portion, movement of said operating member applying a force to said plate causing flexing thereof about a first axis in the plane of the plate and extending from a point intermediate said second pair of contacts toward said mounting portion, separating one of the movable contacts from the associated fixed contact, the point of engagement of said operating member being offset from said axis, further movement of said operating member causing flexing of said plate about a second axis in the plane thereof and generally perpendicular to said first axis, to separate the other of said movable contacts from its associated fixed contact.

10. Switch means comprising: a base; a flexible resilient plate mounted on said base and secured thereto at at least two points defining a mounting line; a pair of fixed contacts; a pair of movable contacts carried by said plate, a line through said contact being out of parallelism with said mounting line; and an operating member engaging said plate intermediate the plate mounting line and the line through said contacts and offset from an axis of flexure extending from the plate mounting line between said movable contacts, movement of said member causing initial flexure of said plate about said axis separating one of the movable contacts from the associated fixed contact and continued movement of said operating member causing flexure of the plate about the mounting line thereof, separating the other movable contact from its associated fixed contact.

References Cited in the file of this patent

UNITED STATES PATENTS

| | | |
|---|---|---|
| 2,646,485 | Cole | July 21, 1953 |
| 2,663,771 | Hartz | Dec. 22, 1953 |
| 2,671,836 | Anger et al. | Mar. 9, 1954 |
| 2,671,841 | Vaksvik et al. | Mar. 9, 1954 |
| 2,812,401 | Waters | Nov. 5, 1957 |

UNITED STATES PATENT OFFICE

CERTIFICATE OF CORRECTION

Patent No. 2,923,789　　　　　　　　　　　　February 2, 1960

Frank S. Howard

It is hereby certified that error appears in the printed specification of the above numbered patent requiring correction and that the said Letters Patent should read as corrected below.

Column 6, line 1, for the claim reference numeral "6" read -- 5 --.

Signed and sealed this 2nd day of August 1960.

(SEAL)
Attest:
KARL H. AXLINE
Attesting Officer

ROBERT C. WATSON
Commissioner of Patents